(12) United States Patent
Hao et al.

(10) Patent No.: US 7,567,250 B2
(45) Date of Patent: Jul. 28, 2009

(54) VISUAL BOUNDARIES FOR AGGREGATE INFORMATION IN PIXEL-ORIENTED GRAPHS

(75) Inventors: Ming C. Hao, Palo Alto, CA (US);
Umeshwar Dayal, Saratoga, CA (US);
Stephany Kalil, Bedford, NH (US);
Peter Wright, E Woodstock, GA (US);
Betty Cant, Sunnyvale, CA (US);
Ming-Chien Shan, Saratoga, CA (US);
Fabio Casati, Palo Alto, CA (US); Vijay Machiraju, Mountain View, CA (US);
Pankaj K. Garg, Sunnyvale, CA (US);
Klaus Wurster, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 10/694,076

(22) Filed: Oct. 27, 2003

(65) Prior Publication Data

US 2005/0088441 A1    Apr. 28, 2005

(51) Int. Cl.
*G06T 11/20*    (2006.01)
(52) U.S. Cl. ............. 345/440; 345/35; 345/440.2
(58) Field of Classification Search ............. 345/440
See application file for complete search history.

(56) References Cited

U.S. PATENT DOCUMENTS 5,581,797 A * 12/1996 Baker et al. ............. 715/708
5,634,133 A *  5/1997 Kelley ..................... 715/209
5,929,863 A *  7/1999 Tabei et al. ............. 345/440
6,211,880 B1 *  4/2001 Impink, Jr. ............. 345/418
7,221,474 B2 *  5/2007 Hao et al. .............. 358/1.18
2002/0118193 A1 *  8/2002 Halstead, Jr. .......... 345/440
2003/0071815 A1 *  4/2003 Hao et al. ............... 345/440

OTHER PUBLICATIONS

Daniel A. Keim et al., "Hierarchical Pixel Bar Charts". IEEE Transactions on Visualization and Computer Graphics, vol. 8, No. 3, Jul.-Sep. 2002, pp. 255-269.*
Daniel A. Keim, "Designing Pixel-Oriented Visualization Techniques: Theory and Applications", IEEE Transactions on Visualization and Computer Graphics, vol. 6, No. 1, Jan.-Mar. 2002, pp. 59-78.*
Keim, Daniel et al. "Pixel Bar Charts: A New Technique for Visualizing Large Multi-Attribute Data Sets without Aggregation", http://www.hpl.hp.com/techreports/2001/HPL-2001-92.html; 2001.*
Ankerst, Mihael "Towards an Effective Cooperation of the User and the Computer for Classification",ACM SIGKDD 2000.*
Hao, Ming et al. "Vlsual Mining of E-Customer Behavior Using Pixel Bar Charts", http://www.hpl.hp.com/techreports/2001/HPL-2001-144.html; 2001.*

* cited by examiner

*Primary Examiner*—Kee M Tung
*Assistant Examiner*—Michelle K Lay

(57) ABSTRACT

A method for generating a pixel-oriented graph provides visual boundaries for representing aggregate information. The present method for generating a pixel-oriented graph includes determining a visual boundary for representing an aggregate of a set of information depicted in the pixel-oriented graph and constructing a set of pixel blocks that represent the information such that the pixel blocks are visually distinguished by the visual boundary. A method according to the present techniques employs a visual weight to classify labels and high weight information is shown and other information is made invisible and hidden in the property of a graph.

33 Claims, 4 Drawing Sheets

VISUAL BOUNDARIES FOR AGGREGATE INFORMATION IN PIXEL-ORIENTED GRAPHS

BACKGROUND

A variety of systems may employ data visualization techniques to represent large amounts of data on a display. For example, data analysis systems, monitoring system, and design systems may employ data visualization techniques. Examples of data visualization techniques include the construction of bar graphs, pie charts, and pixel-oriented graphs.

A pixel-oriented graph may be used to provide a visual representation of large amounts of data in a relatively small area of a display. For example, each pixel in a pixel-oriented graph may be used to represent a corresponding data value. This may enable the representation of large numbers for data values in a relatively small area of a display given the very small display area taken up by a pixel. For example, a 100 by 100 pixel area of a display may be used to depict up to 10,000 data values. The magnitude of a data value in a pixel-oriented graph may be indicated by the color of the pixel. Examples of pixel-oriented graphs include pixel bar charts, spiral graphs, and circle segments.

Unfortunately, prior pixel-oriented graphs such as spiral graphs, circle segments, and pixel bar charts may show only data distributions, patterns, and trends without aggregate information. Examples of aggregate information include average, median or threshold values associated with the data depicted in the graph. Without aggregate information, prior pixel-oriented graphs lack may lack the utility of traditional bar charts that include aggregate information.

SUMMARY OF THE INVENTION

A method for generating a pixel-oriented graph is disclosed that provides visual boundaries for representing aggregate information. The present method for generating a pixel-oriented graph includes determining a visual boundary for representing an aggregate of a set of information depicted in the pixel-oriented graph and constructing a set of pixel blocks that represent the information such that the pixel blocks are visually distinguished by the visual boundary.

A data analysis system according to the present techniques may enable users, e.g. data analysts, to dynamically select the aggregate information that is to be depicted as well as the visual boundaries. Visual weight may be used to classify labels so that only information with a relatively high weight is shown and others may be made invisible in a hidden property of a graph.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
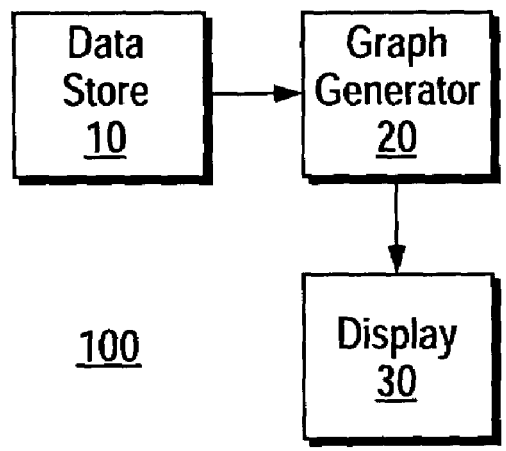
FIG. 1 shows a data analysis system according to the present techniques.

FIG. 1 shows a data analysis system 100 according to the present techniques. The data analysis system 100 includes a graph generator 20 that generates a pixel-oriented graph to be rendered on a display 30 in response to information contained in a data store 10. The pixel-oriented graph generated by the graph generator 20 includes visual boundaries for representing aggregate information according to the present techniques.

The data store 10 holds a set of data records that pertain to a system under analysis or a particular application. A data record may represent a transaction item in an e-commerce system, a data record in a financial, manufacturing, sales/marketing system, etc. to name a few examples.

Figure 2:
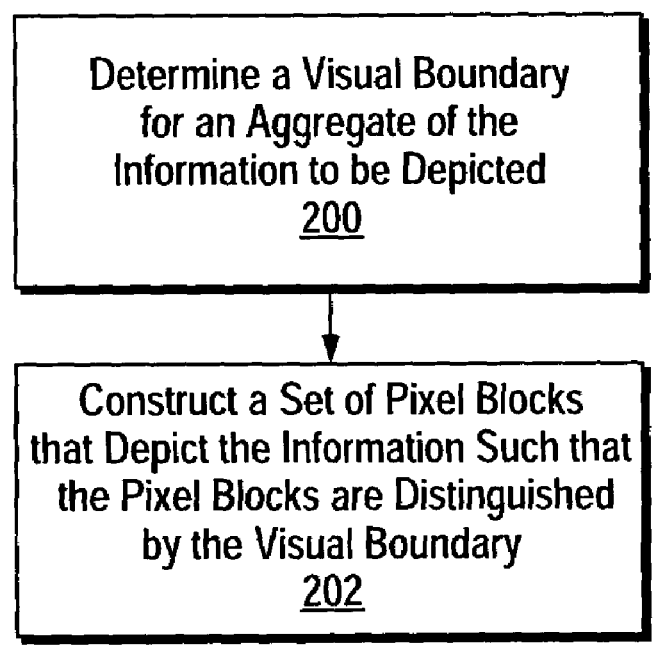
FIG. 2 shows a method for generating a graph according to the present teachings.

FIG. 2 shows a method for generating a pixel-oriented graph according to the present teachings. The method of FIG. 2 can be performed by a computer program contained in a computer-readable storage media that when executed performs the tasks of FIG. 2. The graph generator 20 uses these steps to generate a pixel-oriented graph for rendering on the display 30 in response to the information contained in the data store 10. The pixel-oriented graph may be used to depict a set of values of a particular variable that is recorded in the data store 10.

At step 200, a visual boundary is determined for representing an aggregate of a set of information to be depicted in the pixel-oriented graph. The visual boundary and/or the aggregate may be selected via user input, e.g. via user input devices associated with the graph generator 20.

A visual boundary from step 200 may depend on a particular application and/or on the information being depicted. There may be multiple visual boundaries provided in a pixel-oriented graph according to the present techniques. One example of a visual boundary is a line having a specified color. Another example of a visual boundary is a curve having a specified color. Another example of a visual boundary is a block or area filled with a specified color.

An aggregate from step 200 may be a value or indicator that pertains to the set of information being depicted in the pixel-oriented graph. One example of an aggregate is an average value of a variable that is to be represented in the pixel-oriented graph. Another example of an aggregate is a median value of a variable that is to be represented in the pixel-oriented graph. Another example of an aggregate is a threshold value of a variable that is to be represented in the pixel-oriented graph. The particular aggregate may be specified via user input.

At step 202, a set of pixel blocks that represent the information depicted in the pixel-oriented graph is constructed such that the pixel blocks are visually distinguished by a visual boundary from step 200. There may be any number of pixels blocks depending on the number and arrangement of visual boundaries.

Figure 3A:
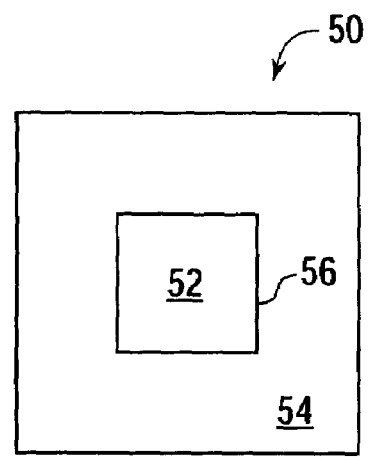
FIGS. 3a-3f show example pixel-oriented graphs according to the present techniques.

FIG. 3a shows an example pixel-oriented graph 50 generated by the graph generator 20 according to the present techniques. The data store 10 in this example includes a set of data records each including a value for a variable represented by the pixel-oriented graph 50. The variable depicted in the pixel-oriented graph 50 may be referred to as the represented variable.

The graph generator 20 determines at step 200 a visual boundary in the form of a rectangle 56 for representing an aggregate pertaining to the represented variable. The graph generator 20 at step 202 generates the pixel-oriented graph 50 by constructing a set of pixel blocks 52-54 that are visually distinguishable by the rectangle 56.

The pixel blocks 52-54 contain a pixel-oriented spiral graph in which the color of each pixel represents a value of the represented variable from corresponding data record in the data store 10. The resulting visual representation enables a user to see the pixels contained within the rectangle 56 within the pixel block 52 as representing the data records having a value for the represented variable that is less than the aggregate depicted by the rectangle 56 and the pixels outside the rectangle 56 within the pixel block 54 as representing the data records having a value for the represented variable that is greater than the aggregate depicted by the rectangle 56. The graph generator 20 preferably draws the rectangle 56 using a color that is easily distinguishable from the spiral graph colors in the pixel blocks 52-54.

For example, the data records in the data store 10 may pertain to an e-commerce application in which each data record represents a sales transaction and the represented variable may a dollar amount of the sales transactions. The graph generator 20 determines an aggregate of dollar amounts from the data records and represents the aggregate as the rectangle 56. For example, the aggregate may be the mean, median, etc. of the dollar amounts in the data records or a threshold dollar amount specified by a user. The resulting visual representation enables a user to see the pixels contained within the rectangle 56 as representing the sales transactions having a dollar amount that is less than the aggregate dollar amount and the pixels outside the rectangle 56 as representing the sales transactions having a dollar amount that is greater than the aggregate dollar amount.

Figure 3B:
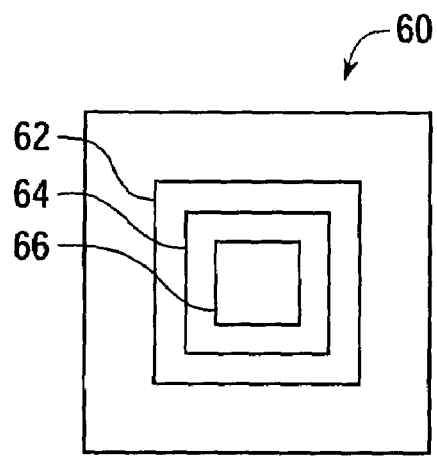

FIG. 3b shows an example pixel-oriented graph 60 generated by the graph generator 20 according to the present techniques. In this example, the graph generator 20 determines at step 200 a set of visual boundaries in the form of a set of rectangles 62-66 for representing set of aggregates. For example, the rectangle 64 may represent an average dollar amount of a sales transaction and the rectangle 62 may represent a high threshold on dollar amount and the rectangle 66 a low threshold on dollar amount.

The graph generator 20 at step 202 generates the pixel-oriented graph 60 by constructing a set of pixel blocks that are visually distinguishable by the rectangles 62-66. The pixel blocks contain a pixel-oriented spiral graph in which the color of each pixel represents a dollar amount of a sales transaction from a corresponding data record in the data store 10.

The resulting visual representation enables a user to see the pixels contained within the rectangle 64 as representing the sales transactions having a dollar amount that is less than the average dollar amount and the pixels outside the rectangle 64 as representing sales transactions having a dollar amount that is greater than the average dollar amount. The resulting visual representation also enables a user to see that the pixels contained within the rectangle 66 represent the sales transactions having a dollar amount that is less than the low threshold dollar amount and the pixels outside the rectangle 66 represent the sales transactions having a dollar amount that is greater than the low threshold dollar amount and that the pixels contained within the rectangle 62 represent the sales transactions having a dollar amount that is less than the high threshold dollar amount and the pixels outside the rectangle 62 represent sales transactions having a dollar amount that is greater than the high threshold dollar amount.

The graph generator 20 preferably draws the rectangles 62-66 using colors, e.g. red, yellow, white, that are easily distinguishable from the spiral graph colors in the pixel blocks of the pixel-oriented graph 60.

Figure 3C:
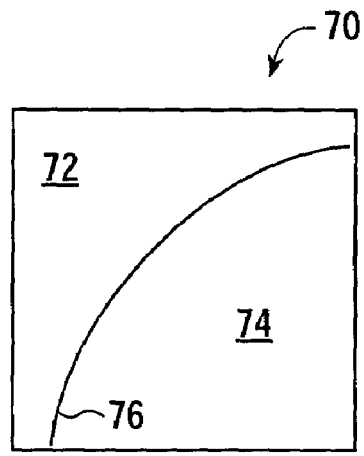

FIG. 3c shows an example pixel-oriented graph 70 generated by the graph generator 20 according to the present techniques. In this example, the graph generator 20 determines at step 200 a boundary curve 76 as a visual boundary for an aggregate and at step 202 constructs a set of pixel blocks 72-74 that are distinguished by the boundary curve 76. The represented variable in this example is a quantity associated with sales transactions recorded in the data store 10 and the aggregate is an average sales quantity, sales dollar amount, etc. The pixel block 74 represents the quantities for sales transactions that occurred with a sales promotion and the pixel block 72 represents the quantities for sales transactions that occurred without a sales promotion. The graph generator 20 may draw the boundary curve 76 using a color that is visually distinguishable from the colors in the pixel blocks 72-74 that represent quantities sold.

Figure 3D:
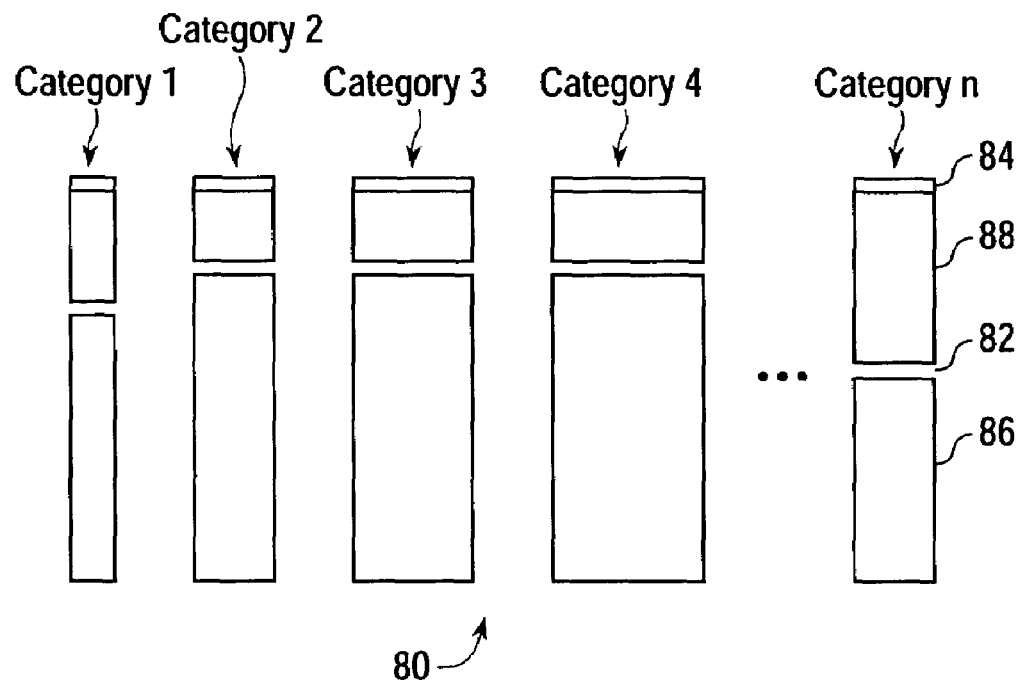

FIG. 3d shows an example pixel-oriented graph 80 generated by the graph generator 20 according to the present techniques. The pixel-oriented graph 80 is arranged into a set of categories 1-n and the graph generator 20 at step 200 determines a set of visual boundaries for a set of aggregates for each category 1-n and at step 202 constructs a set of pixel blocks in each category 1-n that are distinguishable by the corresponding visual boundaries. In the category n, for example, the graph generator 20 at step 200 determines a line 82 as a visual boundary for an aggregate average response time of sales transactions and a rectangle 84 as a visual boundary for an aggregate high threshold response time. In the category n, the graph generator 20 at step 202 constructs a pixel block 86 representing sales transactions having response times recorded in the data store 10 that are below the average response time and a pixel block 88 representing sales transactions that are above the average response time and below the high threshold response time.

Each category 1-n has the same height in the graph 80 and the categories 1-n that include more sales transaction have greater widths to hold the pixels that represent the volumes of the corresponding sales transactions. The color of each pixel in the pixel blocks in the pixel-oriented graph 80 represents the value of the response time for the corresponding transaction. The graph generator 20 preferably draws the line 82 and the rectangle 84 in colors that are distinguishable from the remainder of the graph 80 and from each other. For example the line 82 may be white and the rectangle 84 red with a red pixel indicated a sales transaction having an excessive response time.

Figure 3E:
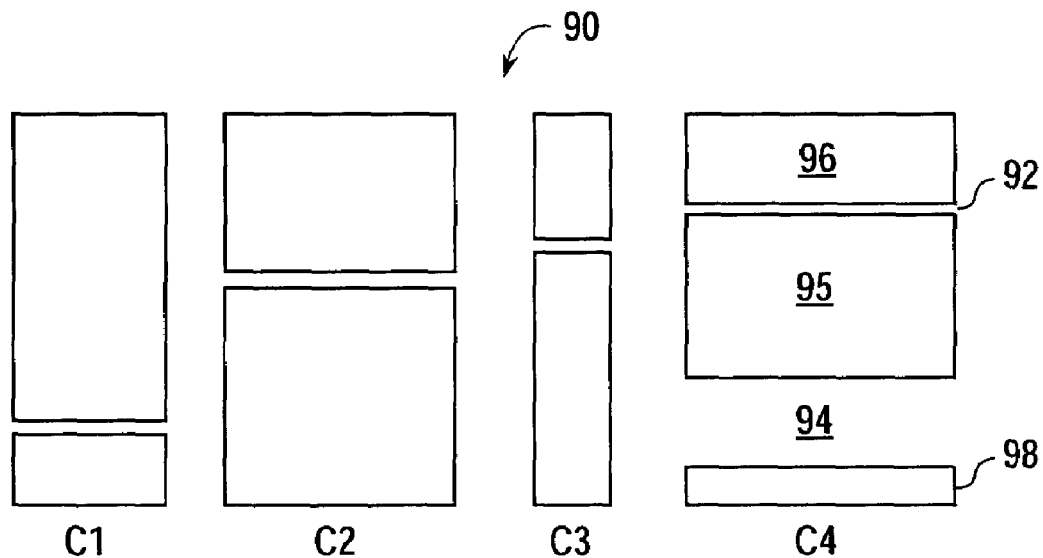

FIG. 3e shows an example pixel-oriented graph 90 generated by the graph generator 20 according to the present techniques. In this example, the graph generator 20 uses the pixel-oriented graph 90 to represent a set of revenue transactions that are arranged into a set of product categories C1-Cn each representing a corresponding product.

The graph generator 20 at step 200 determines a visual boundary that represents a corresponding aggregate, in this example an average revenue, for each product category C1-Cn and at step 202 constructs a set of pixel blocks in each product category C1-Cn that are distinguishable by the corresponding visual boundary. In the product category Cn, for example, the graph generator 20 at step 200 determines a line 92 as a visual boundary for an average revenue of sales transactions and a divider area 94 as a visual boundary for a zero revenue in product category Cn. At step 202, the graph generator 20 constructs a pixel block 96 representing sales transactions in product category Cn that are above the average revenue and a pixel block 98 representing sales transactions that are below the zero revenue aggregate, e.g. due to product returns, and a pixel block 95 representing sales transactions that are between zero and the average revenue.

Each product category C1-Cn has the same height in the graph 90 and the product categories C1-Cn that include more revenue transactions have greater widths to hold the corresponding pixels that represent the number of revenue transactions. The color of each pixel in the pixel-oriented graph 90 represents the revenue in dollars for the corresponding revenue transaction. The graph generator 20 preferably draws the line 92 and the area 84 in colors that are distinguishable from the remainder of the graph 90. For example the line 92 may be white and the rectangle 94 white which contrasts with colors used to draw the pixel blocks 95, 96, and 98.

Figure 3F:
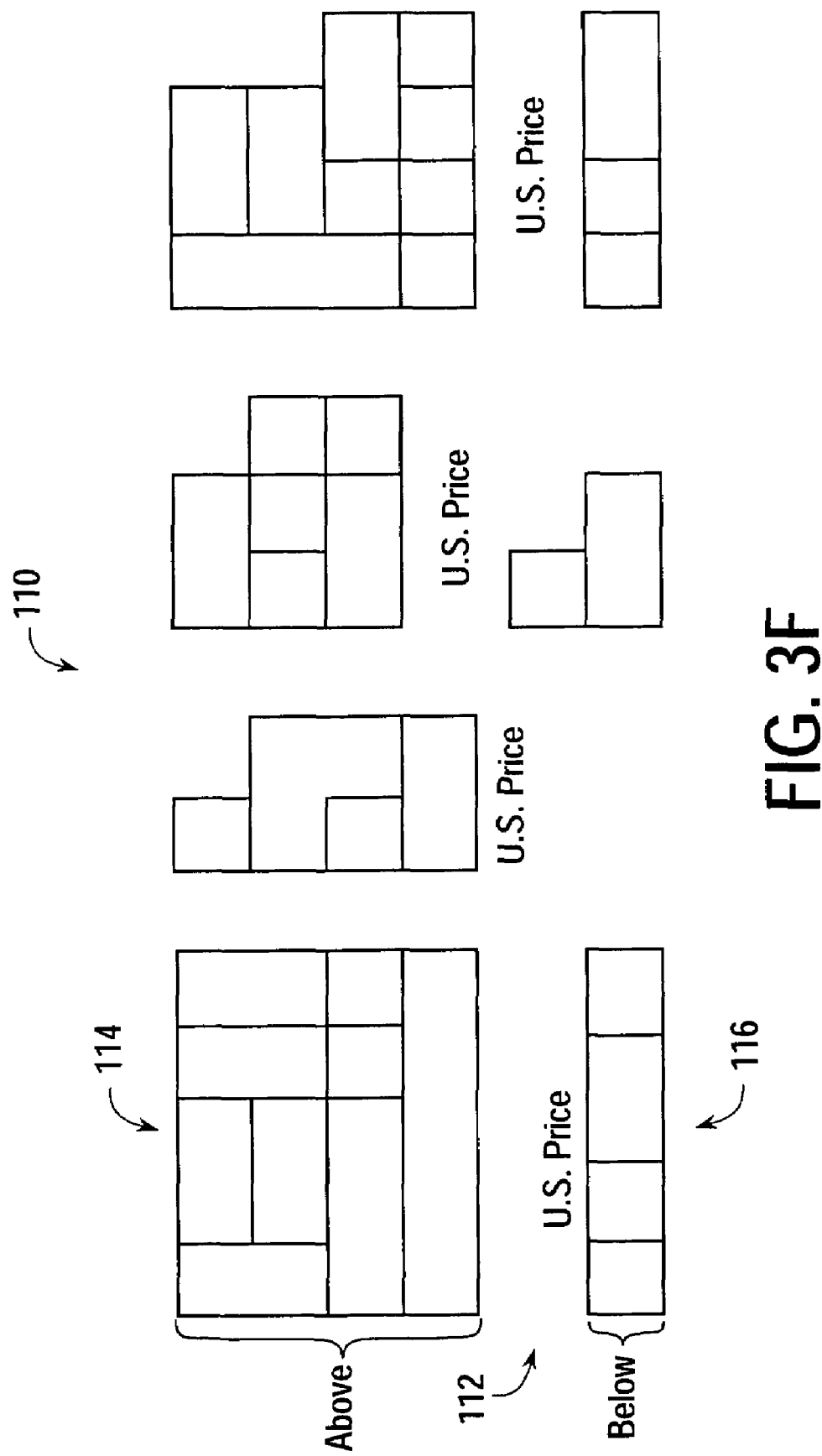

FIG. 3f shows an example pixel-oriented graph 110 generated by the graph generator 20 according to the present techniques. In this example, the graph generator 20 uses the pixel-oriented graph 110 to represent a price ratio for a set of sales transactions for a particular item in relation to a U.S. sales price.

The graph generator 20 at step 200 determines a visual boundary in the form of a rectangle 112 that represents a U.S. price as an aggregate and at step 202 constructs a pixel block 114 for depicting countries having a sales price above the U.S. price and a pixel block 116 for depicting countries having a sales price below the U.S. price. Each color in the pixel-oriented graph 110 represents a corresponding country. The pixel-oriented graph 110 indicates a price ratio as compared to the U.S. price.

The graph generator 20 may preferably draw the boundary rectangle 112 in a manner that is visually distinguishable from the remainder of the graph 120. For example the boundary rectangle 112 is the "U.S. Price" and may be white and the pixel blocks 114 and 116 may be colors such that different colors indicate different countries. The block 114 represents the countries where the sales price is above the "U.S. price." The block 116 represents the countries where the sales price is below the "U.S. price."

The data analysis system 100 includes a selection device, for example keyboard/mouse, that enables a user to dynamically select a sub-area of a pixel-oriented graph generated by the graph generator 20 on the display 30. The selection of a sub-area of a pixel-oriented graph on the display 30 may be referred to as rubber-banding a selected area. In response to the selection of a sub-area, the data analysis system 100 displays aggregated information from the selected area. This may include a dynamic selection of an area of the pixel-oriented graph by the user, calculating the size and location of the rectangle/circle area of the rubber-banding area, transforming the rectangle/circle area to the corresponding graph location, and displaying the selected aggregation data. Examples of aggregated information include the number of data records contained in the sub-area, the average response time for the corresponding sales transaction, etc.

The graph generator 20 may include a set of visual weights in a pixel-oriented graph to provide additional aggregation information to a user. The visual boundaries together with the visual weights enable the analysis of very large data sets without cluttering the display 30 while also providing a visual indication of data distribution and aggregation.

The visual boundaries generated by the graph generator 20 may be lines, rectangles, circles, segments etc., that partition the represented data from the data store 10 and mark its distribution. The visual weights generated by the graph generator 20 may be used to classify labels. In one embodiment, only information with high weights is shown on the display 30. Others weights may be invisible on the display 30 and hidden in a set of properties associated with a pixel-oriented graph generated by the graph generator 20.

Step 200 may include a user input step that enables users to dynamically perform visual separation of a pixel-oriented graph. A user may dynamically select the types of visual aggregation boundaries and/or the aggregations as desired.

The pixels blocks constructed at step 202 may be processed to fill in any gaps in the pixel blocks and to provide a continuous and smooth view of the pixel blocks. A variety of padding/smoothing methods may be employed. For example, a pixel block may be smoothed by using an iterative process of replicating adjacent pixels in the pixel block to fill in gaps and provide smooth visual transitions. The smoothing steps may be adapted to a multi-category graph by providing sections of the graph having the same height or the same diameter.

In addition, coloring may be used to fill up areas that correspond to user-defined thresholds or other aggregate values, e.g. zero revenue transactions, average values, U.S. price. The importance of the aggregated data may be weighted and the aggregated data may hide other data based on its importance. A step may be added to allow a user to dynamically select data aggregation types.

Steps 200-202 may be repeated any number of times to enable a user to dynamically reselect data aggregation types and/or boundaries.

The present techniques enable system analysts to visually analyze large volumes of data, e.g. to improve performance for faster service. The present techniques enable system analysts to quickly visualize the aggregated data and navigate on the detail information to discover the patterns and trends. The use of visual boundaries and weighted labeling methods, e.g. line, curve, or area dividers, and hidden labels provide human intuitiveness without overwhelming users with too many labels and numbers. Visual Boundaries enable the user to visually divide the data distribution into categories and provide business analysts with both aggregated values and data distribution with boundaries at same time. The aggregated values provide analysts with totals and averages that enables the discovery of patterns and trends. As a result, analysts can understand their business relationships and improve service quality. In addition, an analyst may dynamically select any area in the pixel-oriented graph to retrieve both aggregated and detail data.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for generating a pixel-oriented graph, comprising:

determining, by a computer, a first visual boundary for representing a first aggregate of a set of values of a variable of pixels depicted in the pixel-oriented graph, wherein the pixels correspond to respective data records, wherein the first aggregate of the set of values of the variable is computed by applying an aggregate function on the set of values of the variable, wherein the first visual boundary is selectable from among plural types of visual boundaries based on received input;

after determining the first visual boundary, constructing, by the computer, a set of pixel blocks such that the pixel blocks are visually distinguished by the first visual boundary, each pixel block having a corresponding set of the pixels and each pixel having a pixel value that visually represents a corresponding one of the values of the variable.

2. The method of claim 1, further comprising selecting the first visual boundary from among the plural types of visual boundaries based on the received input from a user.

3. The method of claim 1, wherein determining the first visual boundary comprises determining a location for the first visual boundary in the pixel-oriented graph in response to the first aggregate.

4. The method of claim 1, wherein constructing the set of pixel blocks comprises positioning the pixel blocks at different locations with respect to the first visual boundary.

5. The method of claim 1, further comprising filling in one or more gaps in the pixel blocks by replicating one or more pixels in the pixel blocks.

6. The method of claim 1, further comprising coloring the visual boundary.

7. The method of claim 1, further comprising applying a weight to the visual boundary that indicates a relative importance of the first aggregate.

8. The method of claim 1, further comprising selecting the first visual boundary from among the plural types of visual boundaries based on the received input, wherein the plural types of visual boundaries include two or more of:
a line,
a curve,
a rectangle, and
a circle.

9. The method of claim 1, further comprising determining a second visual boundary for representing a second aggregate of the set of values of the variable, wherein the second aggregate is a different type of aggregate than the first aggregate, and wherein the pixel blocks are further visually distinguished by the second visual boundary.

10. The method of claim 9, wherein the first aggregate is one of an average and median of the values of the variable, and the second aggregate is a threshold.

11. The method of claim 9, wherein the second visual boundary is of a different type from the first visual boundary.

12. The method of claim 1, wherein determining the first visual boundary comprises determining the first visual boundary that is a boundary curve.

13. The method of claim 1, further comprising:
dividing the pixel-oriented graph into plural bars corresponding to plural corresponding groups of the pixels,
wherein constructing the set of pixel blocks comprises providing pixel blocks in each of the plural bars, and wherein the first visual boundary is provided in each of the plural bars.

14. The method of claim 13, further comprising:
determining a second visual boundary for representing a second aggregate of the values of the variable; and
providing the second visual boundary in each of the bars.

15. The method of claim 1, wherein the aggregate function is one of an average function and a median function.

16. A data analysis system, comprising:
a data store for holding a set of values of a variable;
a display for providing a pixel-oriented graph that represents the values;
a graph generator to obtain the values from the data store and to determine a first visual boundary for representing a first aggregate of the values and to construct a set of pixel blocks that represent the values such that the pixel blocks are visually distinguished by the first visual boundary, wherein the first aggregate of the values is computed by applying an aggregate function on the set of the values of the variable, and wherein the first visual boundary is selectable to have one of plural different shapes, each pixel block having a corresponding set of pixels and each pixel having a pixel value that visually represents one of the values of the variable.

17. The data analysis system of claim 16, wherein the graph generator is to obtain a selection of the first aggregate from a user.

18. The data analysis system of claim 16, wherein the graph generator is to construct the pixel blocks by positioning the pixel blocks at different locations with respect to the first visual boundary.

19. The data analysis system of claim 16, wherein the graph generator is to fill in one or more gaps in the pixel blocks by replicating one or more pixels in the pixel blocks.

20. The data analysis system of claim 16, wherein the graph generator is to color the visual boundary.

21. The data analysis system of claim 16, wherein the graph generator is to apply a weight to the visual boundary that indicates a relative importance of the aggregate.

22. The data analysis system of claim 16,
wherein the graph generator is to:
receive input regarding selection of the first visual boundary, and
select one of the plural shapes for the first visual boundary based on the received input.

23. The data analysis system of claim 16, wherein the plural different shapes comprise two or more from:
a line,
a curve,
a rectangle, and
a circle.

24. The data analysis system of claim 16, wherein the graph generator is to determine a second visual boundary for representing a second aggregate of the set of values of the variable where the second aggregate is a different type of aggregate than the first aggregate,
wherein the pixel blocks are further visually distinguished by the second visual boundary.

25. The data analysis system of claim 24, wherein the first aggregate is one of an average and median of the values of the variable, and the second aggregate is a threshold.

26. The data analysis system of claim 16, wherein the graph generator is to further:
divide the pixel-oriented graph into plural bars corresponding to plural corresponding groups of the pixels,
wherein the set of pixel blocks comprises pixel blocks in each of the plural bars, and where the first visual boundary is provided in each of the plural bars.

27. The data analysis system of claim 26, wherein the graph generator is to further determine a second visual boundary for representing a second aggregate of the values of the variable, and
provide the second visual boundary in each of the bars.

28. A computer-readable storage medium that contains a computer program that when executed generates a pixel-oriented graph by:
determining a first visual boundary for representing a first aggregate of a set of values of a variable of pixels depicted in the pixel-oriented graph, wherein the pixels correspond to respective data records, wherein the first aggregate of the set of values of the variable is computed by applying an aggregate function on the set of values of the variable, wherein the first visual boundary is selectable from among plural types of visual boundaries based on received input; and after determining the first visual boundary, constructing a set of pixel blocks such that the pixel blocks are visually distinguished by the first visual boundary, each pixel block having a corresponding set of the pixels and each pixel having a pixel value that visually represents a corresponding one of the values of the variable.

29. The computer-readable storage medium of claim 28, wherein the computer program when executed further performs:
   a line,
   a curve,
   a rectangle, and
   a circle.

30. The computer-readable storage medium of claim 28, wherein the computer program when executed further performs:
   determining a second visual boundary for representing a second aggregate of the set of values of the variable, wherein the second aggregate is a different type of aggregate than the first aggregate, and wherein the pixel blocks are further visually distinguished by the second visual boundary.

31. The computer-readable storage medium of claim 30, wherein the first aggregate is one of an average and median of the values of the variable, and the second aggregate is a threshold.

32. The computer-readable storage medium of claim 28, wherein the computer program when executed further performs:
   dividing the pixel-oriented graph into plural bars corresponding to plural corresponding groups of the pixels,
   wherein constructing the set of pixel blocks comprises providing pixel blocks in each of the plural bars, and wherein the first visual boundary is provided in each of the plural bars.

33. The computer-readable storage medium of claim 32, wherein the computer program when executed further performs:
   determining a second visual boundary for representing a second aggregate of the values of the variable; and
   providing the second visual boundary in each of the bars.

* * * * *